(12) United States Patent
Umeyama et al.

(10) Patent No.: US 10,026,941 B2
(45) Date of Patent: Jul. 17, 2018

(54) SEPARATOR FOR NONAQUEOUS ELECTROLYTE SECONDARY BATTERY, AND BATTERY INCLUDING SAME

(71) Applicant: TOYOTA JIDOSHA KABUSHIKI KAISHA, Toyota-shi, Aichi-ken (JP)

(72) Inventors: Hiroya Umeyama, Okazaki (JP); Tatsuya Hashimoto, Osaka (JP); Yusuke Fukumoto, Toyonaka (JP); Keisuke Ohara, Osaka (JP); Kouichi Toriyama, Osaka (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 239 days.

(21) Appl. No.: 15/039,688

(22) PCT Filed: Nov. 26, 2014

(86) PCT No.: PCT/IB2014/002565
§ 371 (c)(1),
(2) Date: May 26, 2016

(87) PCT Pub. No.: WO2015/079304
PCT Pub. Date: Jun. 4, 2015

(65) Prior Publication Data
US 2016/0380250 A1     Dec. 29, 2016

(30) Foreign Application Priority Data

Nov. 29, 2013 (JP) .................................. 2013-248529

(51) Int. Cl.
*H01M 2/16* (2006.01)
*H01M 10/052* (2010.01)

(52) U.S. Cl.
CPC ......... *H01M 2/1686* (2013.01); *H01M 2/166* (2013.01); *H01M 2/1653* (2013.01); *H01M 10/052* (2013.01)

(58) Field of Classification Search
CPC .. H01M 2/1686; H01M 2/1653; H01M 2/166; H01M 10/052
See application file for complete search history.

(56) References Cited

U.S. PATENT DOCUMENTS

2007/0122716 A1*  5/2007 Seo ..................... H01M 2/1646
                                                            429/251
2014/0154583 A1*  6/2014 Ueki .................... H01M 2/1666
                                                            429/246
(Continued)

FOREIGN PATENT DOCUMENTS

JP     2004-111157 A    4/2004
JP     2007-012598 A    1/2007
(Continued)

OTHER PUBLICATIONS

Partial Translation of the Communication dated Jan. 5, 2017 issue by the Japanese Patent Office in corresponding application No. 2013-248529.

*Primary Examiner* — Stewart A Fraser
(74) *Attorney, Agent, or Firm* — Sughrue Mion, PLLC

(57) ABSTRACT

A separator 1 for a nonaqueous electrolyte secondary battery, includes a resin-made substrate (2) and a porous heat resistance layer (4) disposed on the substrate. The porous heat resistance layer includes an inorganic filler (6) and hollow bodies (7). The hollow body includes a shell portion and a hollow portion. The shell portion is formed of an acryl resin. The hollow portion is formed inside the shell portion. An opening portion extending through the shell portion to (Continued)

spatially interconnect the hollow portion and the outside of the shell portion is formed in the shell portion.

8 Claims, 2 Drawing Sheets

(56) References Cited

U.S. PATENT DOCUMENTS

| | | | | |
|---|---|---|---|---|
| 2014/0272534 A1* | 9/2014 | Ueki | ................... | H01M 2/1646 |
| | | | | 429/144 |
| 2015/0056490 A1* | 2/2015 | Shimizu | .............. | H01M 2/1653 |
| | | | | 429/144 |

FOREIGN PATENT DOCUMENTS

| | | |
|---|---|---|
| JP | 2013-149434 A | 8/2013 |
| WO | 2013/014742 A1 | 1/2013 |
| WO | 2013/147006 A1 | 10/2013 |

* cited by examiner

SEPARATOR FOR NONAQUEOUS ELECTROLYTE SECONDARY BATTERY, AND BATTERY INCLUDING SAME

BACKGROUND OF THE INVENTION

1. Field of the Invention

The present invention relates to a separator for a nonaqueous electrolyte secondary battery and a battery including the same. More particularly, the present invention relates to a separator which includes a resin-made substrate and a porous heat resistance layer disposed on the substrate.

2. Description of Related Art

A nonaqueous electrolyte secondary battery such as a lithium-ion secondary battery, a nickel-hydrogen battery or the like is extensively used as a so-called portable power supply or as a power supply for driving a motor vehicle. In particular, a lithium-ion secondary battery, which is light in weight and which is capable of obtaining a high energy density, is desirably used as a high-output power supply for driving a motor vehicle such as an electric vehicle, a hybrid vehicle or the like. In general, the nonaqueous electrolyte secondary battery of this kind includes a positive electrode, a negative electrode and a separator. The separator is typically formed of a resin-made porous sheet. The separator has a function of electrically insulating the positive electrode and the negative electrode, a function of holding a nonaqueous electrolyte, and a shutdown function. Further, a predetermined level of heat resistance (durability) is required in the separator. In other words; even when thermal contraction or fracture occurs in the separator due to overheating or other causes, it is required for the separator to prevent occurrence of an internal short-circuit of the positive electrode and the negative electrode, thereby suppressing a temperature rise in the battery as a whole.

As means for responding to such a requirement, there is proposed a separator which includes a porous heat resistance layer (HRL) formed on a surface of a resin-made porous sheet. Typically, the porous heat resistance layer is mainly composed of inorganic compound particles (inorganic filler) and is high in heat resistance and insulation property (nonconductive property). For example, Japanese Patent Application Publication. No. 2013-149434 (JP 2013-149434 A) discloses a separator for a nonaqueous electrolyte secondary battery in which two kinds of insulating inorganic fillers are contained in a porous' heat resistance layer.

However, in the aforementioned battery, there is a possibility that the cycle characteristic is deteriorated or the operation of a current interrupt device (CID) when overcharged is delayed. The inventors have studied this phenomenon from various viewpoints and have found that a stress that may be applied to the separator is involved. In the application such as a vehicle-driving power supply or the like, for the purpose of realizing a high capacity, the battery is generally used in the form of a battery pack fabricated by arranging and confining a plurality of batteries. At this time, a higher stress may be applied to the porous separator than the stress applied to other members. When the battery is charged and discharged (when an active material occludes and emits charge carriers), an active material layer repeats expansion and contraction. Therefore, there may be a case where the separator adjoining the active material layer is gradually crushed and made thin. In this case, the separator's function of holding a nonaqueous electrolyte (liquid retention characteristic) may be impaired. The distance between the positive electrode and the negative electrode may be locally reduced, thereby generating a micro short-circuit, or the reaction of a gas generating agent when overcharged may be inhibited. Accordingly, in order to improve the cycle characteristic or to enhance the operability of the current interrupt device when overcharged, it is necessary to provide a separator which is superior in shape-keeping characteristic (shape stability).

SUMMARY OF THE INVENTION

The present invention provides a separator which is not easily crushed by a stress load and a nonaqueous electrolyte secondary battery provided with the separator.

A separator for a nonaqueous electrolyte secondary battery according to a first aspect of the present invention includes a resin-made substrate and a porous heat resistance layer disposed on the substrate. The porous heat resistance layer includes an inorganic filler and hollow bodies. Each of the hollow bodies includes a shell portion and hollow portion. The shell portion is formed of an acryl resin. The hollow portion is formed inside the shell portion. In the shell portion, there is formed an opening portion which extends through the shell portion and spatially interconnects the hollow portion and the outside of the shell portion. The nonaqueous electrolyte secondary battery may be, e.g., a lithium-ion secondary battery.

According to the first aspect of the present invention, the hollow bodies are contained in the porous heat resistance layer. This makes it possible to give superior flexibility, elasticity and shape-keeping characteristic to the separator. As a result, it is possible to prevent the separator form being crushed. For example, the separator is not easily affected by a battery restraining force or a stress (pressure) which can be applied to the separator due to repeated charge and discharge. It is therefore possible to stably maintain the shape (typically the thickness) of the separator. Thus, it is possible to appropriately maintain the distance between the positive electrode and the negative electrode of the nonaqueous electrolyte secondary battery and to prevent capacity reduction due to a micro short-circuit or self-discharge. When overcharged, it is possible to suitably cause a gas generating agent to react. Further, the hollow bodies are electrochemically stable even in the nonaqueous electrolyte and are capable of retaining the nonaqueous electrolyte in the hollow portions thereof. Thus, the hollow bodies can stably maintain and exhibit superior liquid retention characteristic for a long period of time. Therefore, according to the separator configured as above, it is possible to realize a nonaqueous electrolyte secondary battery in which superior battery performance (e.g., a cycle characteristic, a high-temperature storage characteristic and an output characteristic) and reliability during overcharge can be made compatible at a higher level.

The term "acryl resin" used herein refers to a polymer which contains an acryl-based monomer (namely, a monomer having at least one (meth) acryloyl group in one molecule) as a monomer unit (constituent monomer component) that constitutes the acryl resin. The term "hollow body" used herein refers to a hollow structure particle having a shell portion and a hollow portion formed inside the shell portion. On the cross section taken at a random position of the hollow structure particle, percentage of the hollow portion in an apparent cross-sectional area (a particle porosity to be described later) is 5% or more.

In the separator according to the first aspect of the present invention, the particle porosity of the hollow bodies may be 30% or more and 80% or less. By using this particle porosity, it is possible to realize superior shape-keeping characteristic against a stress load that may be applied during the manufacture or use of the battery. At the same time, it is possible to secure a high liquid retention characteristic. Accordingly, the effects of the present invention can be provided at a higher level. The term "particle porosity" used herein refers to the percentage of the hollow portion in an apparent cross-sectional area of the hollow structure particle on the cross section taken at a random position of the hollow structure particle. This percentage can be obtained through a cross section observation image obtained by cutting (or polishing) a sample, in which material including the hollow structure particle is embedded in a suitable resin (preferably, a thermosetting resin), and observing the cross section of the sample with an electron microscope. In this observation image, depending on the difference in color tone or color shade, the shell portion, the hollow portion and the opening portion of the hollow structure particle can be distinguished from one another. Thus, with respect to a plurality of hollow structure particles, the ratio $C_V/C_T$ of the area $C_V$ occupied by the hollow portions to the apparent cross-sectional area $C_T$ occupied by the hollow bodies is obtained. The particle porosity can be obtained by finding an arithmetic mean of the values of the ratio $C_V/C_T$.

In the separator according to the first aspect, of the present invention, an average particle diameter of the hollow bodies may be 0.05 μm or more and 5 μm or less. By using this average particle diameter, it is possible to homogeneously dispose the hollow bodies in the porous heat resistance layer. As a result, it is possible to appropriately disperse and alleviate the stress which may be applied to the separator, thus realizing a superior shape-keeping characteristic. Unless specifically mentioned otherwise, the term "average particle diameter" used herein refers to a particle diameter ($D_{50}$ particle diameter or median diameter) corresponding to 50 volume % of a cumulative volume from a fine particle side in a volume-based particle size distribution measured by a particle size distribution measuring device using an ordinary laser diffraction and light-scattering method.

In the separator according to the first aspect of the present invention, the percentage of the hollow bodies in an entirety of the porous heat resistance layer may be 0.1 mass % or more and 50 mass % or less. By using this content percentage, it is possible to suppress an increase in resistance due to the addition of the hollow bodies, while securing the shape-keeping characteristic (mechanical strength) of the separator. Accordingly, it is possible to realize higher battery performance.

In the separator according to the first aspect of the present invention, the porosity of the porous heat resistance layer may be 20 volume % or more and 50 volume % or less. By setting the porosity to fall within this range, it is possible to appropriately secure the liquid retention characteristic and an ion permeability, while maintaining the shape-keeping characteristic (mechanical strength). It is therefore possible to reduce a battery resistance and to provide the effects of the present invention at a higher level. The term "porosity" used herein refers to a value which is calculated by a formula: $(1-W/\rho V) \times 100$, where W is a mass (g), V is an apparent volume, and ρ is a true density. The apparent volume V can be calculated by multiplying a plane-view area S and a thickness T. The "plane-view area S" can be found by, e.g., cutting the separator into a square or rectangular shape with a punch or a cutter. The "thickness T" can be measured by, e.g., a micrometer, a thickness gauge (e.g., a rotary caliper gauge), or the like. The "true density ρ" can be measured by a density measuring instrument according to an ordinary constant volume expansion method (gas-substituted pycnometer method).

In the separator according to the first aspect of the present invention, the average thickness of the porous heat resistance layer may be 3 μm or more and 15 μm or less. By setting the thickness to fall within this range, it is possible to more appropriately prevent the positive electrode and the negative electrode from locally getting closer to each other, thereby suppressing generation of a micro short-circuit. Further, the ion permeability becomes good. This makes it possible to further reduce the battery resistance. Accordingly, it is possible to realize superior battery performance and to provide the effects of the present invention at a higher level. The thickness of the porous heat resistance layer can be found not only by the measurement using the micrometer, the thickness gauge or the like, but also by, e.g., the analysis of a cross section image observed with an ordinary scanning electron microscope.

A nonaqueous electrolyte secondary battery according to a second aspect of the present invention includes an electrode body and a nonaqueous electrolyte. The electrode body includes a positive electrode, a negative electrode and a separator according to the first aspect of the present invention. The positive electrode and the negative electrode face each other with the separator interposed therebetween. As mentioned above, the use of the separator according to the first aspect of the present invention makes it possible to persistently provide high battery performance. When overcharged, it is possible to rapidly generate a large amount of gas without hindering the reaction of a gas generating agent. This makes it possible to operate the CID at an early stage. Accordingly, the superior battery performance (e.g., a cycle characteristic) and the reliability (e.g., an overcharge resistance) can be made compatible at a higher level.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
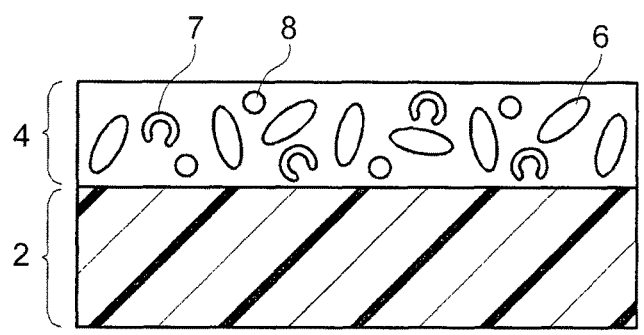
FIG. 1 is a schematic diagram showing a cross-sectional structure of a separator for a nonaqueous electrolyte secondary battery according to one embodiment of the present invention.

Preferred embodiments of the present invention will now be described with reference to the accompanying drawings. In the drawings described below, members or parts performing the same actions will be designated by like reference signs. There may be a case where duplicate description is omitted or simplified. The dimensional relationship (length, width, thickness, etc.) in the respective drawings, does not necessarily reflect an actual dimensional relationship. Matters necessary for carrying out the present invention other than those specifically referred to in the subject specification may be grasped as design matters of an ordinary skilled person based on the related art in this field. The present invention may be carried out on the basis of the content disclosed herein and the common technical knowledge in this field.

<<Separator>>

FIG. 1 schematically shows a cross-sectional structure of a separator for a nonaqueous electrolyte secondary battery according to one embodiment of the present invention. A separator 1 according to the present embodiment includes a resin-made substrate 2 and a porous heat resistance layer 4 on one surface of the substrate 2.

<Porous Heat Resistance Layer 4>

The porous heat resistance layer 4 of the separator 1 for a nonaqueous electrolyte secondary battery disclosed herein is disposed on the substrate 2 and is characterized by including at least inorganic compound particles (inorganic filler) 6 and hollow bodies 7. In the embodiment shown in FIG. 1, the porous heat resistance layer 4 further includes a binder 8. The porous heat resistance layer 4 can be produced by applying (coating) a paste or slurry composition, which is obtained by, e.g., dispersing the inorganic filler 6, the hollow bodies 7, and other optionally-used material (e.g., the binder 8) in a suitable solvent, on the surface of the substrate 2 and then drying the composition. As the solvent, it is possible to use an aqueous solvent or an organic solvent. For example, water can be used as the solvent.

As the inorganic filler 6, it is possible to use various materials which have been conventionally used for this purpose. Preferred examples of the inorganic filler 6 include alumina (aluminum oxide: $Al_2O_3$), alumina hydrate (e.g., boehmite ($Al_2O_3 \cdot H_2O$)), magnesia (magnesium oxide: MgO), and silica (silicon oxide: $SiO_2$). These oxides are high in melting point and are superior in heat resistance. Further, these oxides are relatively high in Mohs hardness and are superior in durability (mechanical strength). Since these oxides are relatively inexpensive, it is possible to reduce the cost of raw materials. The inorganic filler 6 may be, e.g., particulate, fibrous, or plate-like (flaky). From the viewpoint of dispersion stability or the like, the average particle diameter of the inorganic filler 6 may be 5 μm or less (e.g., 2 μm or less, preferably 1 μm or less). A lower limit value of the average particle diameter of the inorganic filler 6 is not particularly limited but may be 0.01 μm or more (typically 0.1 μm or more, e.g., 0.2 μm or more) in view of the handling property. Further, the BET specific surface area of the inorganic filler 6 may be 1 $m^2/g$ to 100 $m^2/g$ (e.g., 1.5 $m^2/g$ to 50 $m^2/g$, typically 2 $m^2/g$ to 10 $m^2/g$).

Each of the hollow bodies 7 is in a hollow particle form and includes a shell portion formed of an acryl resin and a hollow portion (cavity portion) formed inside the shell portion. Using the hollow particles, it is possible to flexibly cope with the stress applied from the outside and to stably maintain the shape of the separator. Further, a nonaqueous electrolyte can be retained in the hollow portion, realizing a high liquid retention characteristic. In contrast with the hollow particles, there are available ordinary porous structure (solid structure) particles. The term "porous structure" used herein refers to a structure in which solid parts and void parts are intermingled over the entirety of a particle (i.e., sponge-like structure). In contrast, the hollow structure particles (hollow bodies 7) disclosed herein are clearly distinguished in, structure from the aforementioned porous structure particles in that a solid part concentrates in the shell portion and a definite unitary space is formed in the hollow portion.

In general, the hollow structure particles (hollow bodies 7) are more easily crushed by a stress load or the like than the solid structure particles. For that reason, in the invention disclosed herein, an acryl resin, which is high in mechanical strength and which is stable in an ordinary nonaqueous electrolyte, is used as the material that forms the shell portion of the particle. Thus, the hollow bodies 7 can be given good shape-keeping characteristic (difficulty in collapse, which may be reflected in, e.g., high average hardness, high compression strength and high elasticity). If the hollow bodies 7 are made of an acryl resin, the slurry composition may exhibit superior dispersion stability when the porous heat resistance layer 4 is formed by the aforementioned method.

The acryl resin contains a monomer having at least one (meth) acryloyl group in one molecule as a constituent monomer component. Typical examples of the acryl resin include an acryl resin in which an acryl-based monomer occupies 50 mass % or more of the entire constituent monomer components. More specifically, examples of the acryl resin include a homopolymer obtained by polymerizing one kind of monomer such as acrylic acid, methacrylic acid, acrylic acid ester, methacrylic acid ester or the like. Alternatively, the acryl resin may be a polymer of a monomer raw material which contains one of the aforementioned monomers as a primary monomer and further contains another monomer (an auxiliary monomer) copolymerizable with the primary monomer. The auxiliary monomer helps introduce a cross-linking point into the acryl-based polymer or helps increase a cohesive force of the acryl-based polymer. As the auxiliary monomer, it is possible to appropriately employ monomer species that are known to be used for this purpose.

The hollow bodies 7 are typically particulate and may have, e.g., a substantially spherical shape or a slightly-distorted spherical shape. For example, the average aspect ratio (the ratio of a short-axis-direction length (typically a thickness) to a long-axis-direction length of a particle) may be 0.5 to 1.0 (typically 0.7 to 1.0). The shape (external shape) and the average aspect ratio of the hollow bodies 7 can be comprehended by, e.g., observing the particle cross section of each of the hollow bodies 7 with an ordinary electron microscope. One specific procedure for obtaining the average aspect ratio is as follows. For example, the particles of at least 30 (e.g., 30 to 100) hollow bodies 7 are observed with an electron microscope. A smallest rectangle circumscribing each particle image is drawn. A value obtained by dividing a short-side length of the rectangle by a long-side length thereof is found as the aspect ratio. An average aspect ratio can be found by arithmetically averaging the aspect ratios of a predetermined number of particles.

The average particle diameter of the hollow bodies 7 may be substantially equal to that of the inorganic filler 6. From the viewpoint of coating work, the average particle diameter of the hollow bodies 7 may be 6 μm or less (preferably 5 μm or less, more preferably 4.8 μm or less, typically 4.5 μm or less, e.g., less than 3 μm). According to the studies made by the inventors, it was found that, if the average particle diameter is too small, the dispersion stability during a coating process tends to decrease. Thus, the lower limit value of the average particle diameter may be 0.03 μm or more (preferably 0.04 μm or more, more preferably 0.05 μm or more, e.g., 0.07 μm or more). If this range is satisfied, it is possible to appropriately realize a porous heat resistance layer which is homogeneous and superior in surface smoothness.

Each of the hollow bodies 7 has a hollow structure whose particle porosity is 5% or more. From the viewpoints of the liquid retention characteristic and the shape-keeping characteristic, the particle porosity is set to become larger than 25% (typically 30% or more, e.g., 40% or more). From the viewpoints of the durability (e.g., the ability to keep the hollow shape against a compression stress which may be applied during the production or use of a battery) and the ease of production, the upper limit value of the particle porosity is usually set to become less than 85% (typically 80% or less, e.g., 70% or less). By setting the particle porosity to fall within the aforementioned range, it is possible to appropriately keep the hollow structure and to persistently provide high battery performance.

In each the hollow bodies 7, the opening portion (through-hole) is formed on the surface of the shell portion. The opening portion is a portion which extends through the shell portion and spatially interconnects the outside (the outside of the particle) and the hollow portion. Thus, each of the hollow bodies 7 can retain the nonaqueous electrolyte in the hollow portion thereof. This makes it possible to realize superior liquid retention ability. Accordingly, in the separator disclosed herein, liquid depletion, namely electrolyte shortage, is unlikely to occur. This makes it possible to appropriately realize a nonaqueous electrolyte secondary battery which is superior in, e.g., cycle characteristic.

Further, in a preferred example, the shell portion other than the opening portion is made of an acryl resin in a dense state (at least so as not to allow an ordinary nonaqueous electrolyte to pass through the shell portion). In general, if charge and discharge are repeated, the nonaqueous electrolyte is squeezed out from the electrode body (particularly, the separator) due to the expansion and contraction of active material particles attributable to the charge and discharge. As a result, the nonaqueous electrolyte may be deficient in a portion of the electrode body and the battery performance (e.g., the cycle characteristic) may deteriorate. However, according to the aforementioned structure, the nonaqueous electrolyte retained in the hollow portion is not eluted from the portion other than the opening portion to the outside of the particle. For that reason, even if a stress load is repeatedly applied to the separator, it is possible to appropriately hold the nonaqueous electrolyte. This makes it possible to effectively prevent or alleviate the nonaqueous electrolyte shortage (liquid depletion) mentioned above.

The hollow bodies 7 having such a shape can be produced using, e.g., thermally expandable microcapsules well-known in the art. In other words, prepared first are thermally-expandable microcapsules of the type in which a volatile organic solvent (an expanding agent, preferably a material having a low boiling point and a large expansion degree, such as hexane, hydrocarbon or the like) is enclosed by an acryl-based polymer (a copolymer such as acrylic acid ester, methacrylic acid ester, acrylonitrile or the like). The thermally-expandable microcapsules may be commercially available or may be produced according to a well-known method. Subsequently, the thermally-expandable microcapsules are heated to a softening point of the acryl-based polymer or higher. Then, the acryl-based polymer begins to be softened. Concurrently, the enclosed expanding agent begins to be gasified and the internal pressure of the capsules begins to increase. Then, the microcapsules are gradually expanded. If the heating goes on, the gas thus generated breaks a film (shell portion) made of polymer and is diffused outward. Thus, it is possible to produce hollow bodies 7 each having an opening portion. According to this method, the average particle diameter and the particle porosity of the hollow bodies 7 can be relatively easily adjusted depending on the particle diameter of the thermally-expandable microcapsules or heating conditions (temperature or time) of the thermally-expandable microcapsules.

The porous heat resistance layer 4 may optionally contain, in addition to the inorganic filler 6 and the hollow bodies 7 described above, one or more kinds of materials which have been conventionally used as constituent components of the porous heat resistance layer of this kind. Examples of such materials include a binder 8 and various kinds of additives. As the binder 8, it is possible to use: acryl-based polymers containing acrylic acid, methacrylic acid, acrylic acid ester or methacrylic acid ester as a primary copolymerization component; rubbers such as styrene-butadiene rubber (SBR), acrylonitrile-butadiene copolymer rubber (NBR), acrylonitrile-isoprene copolymer rubber (NIR), an acrylonitrile-butadiene-isoprene copolymer rubber (NBIR) and the like; polyolefin-based polymers such as polyethylene and the like; or cellulose-based polymers such as carboxymethylcellulose, methylcellulose and the like. In addition, it is possible to appropriately use various kinds of additives such as a thickener, a dispersing agent and the like.

The percentage of the inorganic filler 6 contained in the entirety of the porous heat resistance layer 4 is usually set to become about 40 mass % or more. Typically, it is preferable to set the percentage of the inorganic filler 6 to become 50 mass % to 99.8 mass % (e.g., 80 mass % to 99 mass %). Further, the percentage of the hollow bodies 7 contained in the entirety of the porous heat resistance layer 4 is usually set to become about 50 mass % or less. Typically, it is preferable to set the percentage of the hollow bodies 7 to become 0.1 mass % to 50 mass % (e.g., 1 mass % to 10 mass %). By using the aforementioned percentages, it is possible to realize a separator which is low in resistance and which can be used for a long period time (which is superior in shape-keeping characteristic). In the case of using a binder, the percentage of the binder in the entirety of the porous heat resistance layer 4 is usually set to become about 1 mass % to 10 mass %. Typically, it is preferable to set the percentage of the binder to become about 1 mass % to 5 mass %.

The porosity of the porous heat resistance layer 4 is not particularly limited, but may be, e.g., 20 volume % or more (typically 30 volume % or more) and 50 volume % or less. If the porosity of the porous heat resistance layer 4 is too large, the shape-keeping characteristic (mechanical strength) may be insufficient. If the porosity is too small, there may be a case where the ion permeability deteriorates and the resistance increases or a case where the input/output characteristic deteriorates. By setting the porosity to fall within the aforementioned range, it is possible to provide the effects of the present invention at a higher level. The porosity of the porous heat resistance layer 4 may be adjusted depending on, e.g., the constituent materials, the mixing ratio thereof, the coating method and the drying method.

The thickness of the porous heat resistance layer 4 is not particularly limited but may be usually 0.5 µm or more, and preferably, e.g., 1 µm or more (typically 2 µm or more, preferably 5 µm or more). By setting the thickness of the porous heat resistance layer 4 to fall within the aforementioned range, it is possible to appropriately maintain the insulation between the positive electrode and the negative electrode and to effectively prevent generation of an internal short-circuit. From a viewpoint of reducing the internal resistance, an upper limit value of the thickness of the porous heat resistance layer 4 is usually set to become 20 µm or less, and preferably, e.g., 15 µm or less (typically 10 µm or less). If the aforementioned range is satisfied, superior battery performance and durability can be made compatible at a higher level.

<Substrate 2>

As the substrate 2 for holding the porous heat resistance layer 4, it is possible to desirably use a resin-made porous sheet (a porous resin sheet). Preferred examples of the porous resin sheet include resin sheets mainly composed of thermoplastic resins such as polyolefin like polyethylene (PE) or polypropylene (PP); polyester; cellulose; and polyamide. Among them, it may be possible to use a monolayer or multilayer sheet (a polyolefin-based sheet) mainly composed of one or more kinds of polyolefin-based resins. For example, a PE sheet, a PP sheet or a three-layer (PP/PE/PP) sheet in which PP layers are laminated on both sides of a PE layer, can be appropriately used. If necessary, the porous resin sheet may contain various kinds of additives such as a plasticizer, an antioxidant and the like. The percentage of voids (porosity) of the substrate 2 is not particularly limited, but may be usually 20 volume % to 70 volume %, e.g., 30 volume % to 60 volume %. By setting the porosity of the substrate 2 to fall within the aforementioned range, it is possible to maintain superior shape-keeping characteristics (mechanical strength) and to appropriately maintain the insulation between the positive electrode and the negative electrode. Further, it is possible to realize good ion permeability and to keep the internal resistance low. The thickness of the substrate 2 is not particularly limited, but may be usually 5 μm or more (typically 10 μm or more, e.g., 15 μm or more). Preferably, the thickness of the substrate 2 is 40 μm or less (typically 30 μm or less, e.g., 25 μm or less).

<<Nonaqueous Electrolyte Secondary Battery 100>>

The nonaqueous electrolyte secondary battery disclosed herein includes an electrode body in which a positive electrode and a negative electrode face each other with a separator interposed therebetween, and a nonaqueous electrolyte. The nonaqueous electrolyte secondary battery is characterized in that the aforementioned separator (in which the porous heat resistance layer is provided with the hollow bodies made of an acryl resin) is used as the separator. Accordingly, other configurations are not particularly limited.

The positive electrode is not particularly limited as long as it contains a positive electrode active material. Typically, the positive electrode has a configuration in which a positive electrode active material layer containing the positive electrode active material is fixed onto a positive electrode current collector. As the positive electrode current collector, it is possible to suitably employ a conductive member made of a metal superior in electrical conductivity (e.g., aluminum, nickel, titanium, stainless steel or the like). As the positive electrode active material, it is possible to employ one or more kinds of materials which are known to be usable as a positive electrode active material of a nonaqueous electrolyte secondary battery. Preferred examples of the positive electrode active material include layered or spinel lithium composite metal oxides (e.g., $LiNiO_2$, $LiCoO_2$, $LiFeO_2$, $LiMn_2O_4$, $LiNi_{0.5}Mn_{1.5}O_4$, $LiCrMnO_4$, $LiFePO_4$ or the like). Among them, it is possible to suitably use lithium-nickel-cobalt-manganese composite oxides (e.g., $LiNi_{1/3}Co_{1/3}Mn_{1/3}O_2$) of a layered structure (typically a layered rock salt structure belonging to a hexagonal system) which contain, as constituent elements, Li, Ni, Co and Mn. This is because the lithium-nickel-cobalt-manganese composite oxides are superior in thermal stability and are capable of realizing a high energy density.

If necessary, the positive electrode active material layer may contain, in addition to the aforementioned positive electrode active material, one or two kinds of materials that may be used as constituent components of a positive electrode active material layer in an ordinary nonaqueous electrolyte secondary battery. Examples of these materials include a conductive material and a binder. As the conductive material, it is possible to suitably use a carbon material such as, different kinds of carbon black (typically acetylene black and Ketjen black), activated carbon, graphite or carbon fibers. As the binder, it is possible to suitably use, e.g., polyvinylidene fluoride (PVdF) or polyethylene oxide (PEO). Further, various additives (e.g., an inorganic compound that generates a gas when overcharged, a dispersant and a thickener) may be used unless they severely impair the effects of the present invention.

The mass of the positive electrode active material layer formed per unit area of the positive electrode current collector may be 5 mg/cm$^2$ to 40 mg/cm$^2$ (typically 10 mg/cm$^2$ to 20 mg/cm$^2$) per one surface of the positive electrode current collector. Further, the density of the positive electrode active material layer may be, e.g., 1.5 g/cm$^3$ to 4 g/cm$^3$ (typically 1.8 g/cm$^3$ to 3 g/cm$^3$). Further, the thickness per one surface of the positive electrode active material layer may be, e.g., 40 μm or more, (typically 50 μm or more), and 100 μm or less (typically 80 μm or less). Further, the percentage of voids (porosity) of the positive electrode active material layer may typically be substantially equal to the porosity of the porous heat resistance layer of the separator. More specifically, the porosity of the positive electrode active material layer may be 5 volume % to 40 volume % (preferably 20 volume % to 40 volume %). The thickness, density and percentage of voids of the positive electrode active material layer can be adjusted by, e.g., a press process.

The negative electrode is not particularly limited as long as it contains a negative electrode active material. Typically, the negative electrode is of a type in which a negative electrode active material layer containing a negative electrode active material is fixed onto a negative electrode current collector. As the negative electrode current collector, it is possible to suitably employ a conductive member made of a metal having good electrical conductivity (e.g., copper, nickel, titanium, stainless steel or the like). As the negative electrode active material, it is possible to employ one or more kinds of materials which are known to be usable as a negative electrode active material of a nonaqueous electrolyte secondary battery. Preferred examples of the negative electrode active material include a mixture of two or more kinds of carbon materials differing in crystallinity (e.g., two or more kinds of carbon materials selected from graphite, hard graphitizable carbon (hard carbon), easily graphitizable carbon (soft carbon), carbon nanotube or the like).

If necessary, the negative electrode active material layer may contain, in addition to the negative electrode active material, one or two kinds of materials that can be used as constituent components of a negative electrode active material layer in an ordinary nonaqueous electrolyte secondary battery. For example, as the binder, it is possible to suitably use, e.g., styrene-butadiene rubber (SBR), polyvinylidene fluoride (PVdF), polytetrafluoroethylene (PTFE) or the like. Further, various additives (e.g., a thickener, a dispersant a conductive material or the like) may be used unless they severely impair the effects of the present invention. As the thickener, it is possible to use, e.g., carboxymethyl cellulose (CMC), methyl cellulose (MC) or the like.

The mass of the negative electrode active material layer formed per unit area of the negative electrode current collector may be 5 mg/cm$^2$ to 20 mg/cm$^2$ (typically 7 mg/cm$^2$ to 15 mg/cm$^2$) per one surface of the negative electrode current collector. Further, the density of the negative electrode active material layer may be, e.g., 0.5 g/cm³ to 2 g/cm³ (typically 1 g/cm³ to 1.5 g/cm³). Further, the thickness per one surface of the negative electrode active material layer may be, e.g., 40 μm or more (typically 50 μm or more) and 100 μm or less (typically 80 μm or less). The percentage of voids (porosity) of the negative electrode active material layer may typically be substantially equal to the porosity of the porous heat resistance layer of the separator, e.g., 5 volume % to 50 volume % (preferably 35 volume % to 50 volume %).

Typically, the nonaqueous electrolyte has a configuration in which a supporting salt is dissolved or dispersed in a nonaqueous solvent. The supporting salt is not particularly limited as long as it contains charge carriers (e.g., lithium ions, sodium ions or magnesium ions) (lithium ions in case of the lithium-ion secondary battery). It is possible to appropriately select and use those supporting salts as used in an ordinary nonaqueous electrolyte secondary battery. For example, if the charge carriers are lithium ions, the supporting salt may be lithium salts such as $LiPF_6$, $LiBF_4$, $LiClO_4$ and the like, which can be used either independently or in combination. It is particularly preferable to use $LiPF_6$ as the supporting salt. It is preferred that concentration of the supporting salt is set at 0.7 mol/L to 1.3 mol/L based on the total amount of the nonaqueous electrolyte. Although the nonaqueous solvent is not particularly limited, it is possible to use an organic solvent such as various kinds of carbonates, ethers, esters, nitriles, sulfones, lactones or the like which may be used for a nonaqueous electrolyte of an ordinary nonaqueous electrolyte secondary battery. In one preferred example, a nonaqueous solvent mainly composed of carbonates is used. More specifically, it is possible to suitably use ethylene carbonate (EC), propylene carbonate (PC), diethyl carbonate (DEC), dimethyl carbonate (DMC), ethyl methyl carbonate (EMC) or the like.

In one preferred embodiment, a gas generating agent is contained in the battery (typically; in the nonaqueous electrolyte). The gas generating agent is an additive which is oxidized and decomposed at the positive electrode to generate a gas if the battery voltage exceeds a predetermined voltage. The gas generating agent is not particularly limited and may be a compound whose oxidation potential (vs. Li/Li⁺) is equal to or higher than an upper limit of charge potential of the positive electrode and which is decomposed to generate a gas if the battery voltage exceeds the oxidation potential (if the battery comes into an overcharged state). One or more kinds of gas generating agents used for the same purpose can be used. Specific examples of the gas generating agent include a biphenyl compound, an alkyl biphenyl compound, a cycloalkylbenzene compound, an alkylbenzene compound, an organic phosphorus compound, a fluorine atoms-substituted aromatic compound, a carbonate compound, and an aromatic compound such as alicyclic hydrocarbon or the like. As more specific compounds (abbreviations and approximate oxidation potentials (vs. Li/Li⁺) of the compounds), there are illustrated biphenyl (BP; 4.4V), cyclohexyl benzene (CHB; 4.6V), or the like. The content of the gas generating agent is not particularly limited. From a viewpoint of securing a gas amount sufficient to operate the current interrupt device, the content of the gas generating agent may be set at, e.g., about 0.05 mass % or more, preferably 0.1 mass % or more, based on 100 mass % of the nonaqueous electrolyte.

Figure 2:
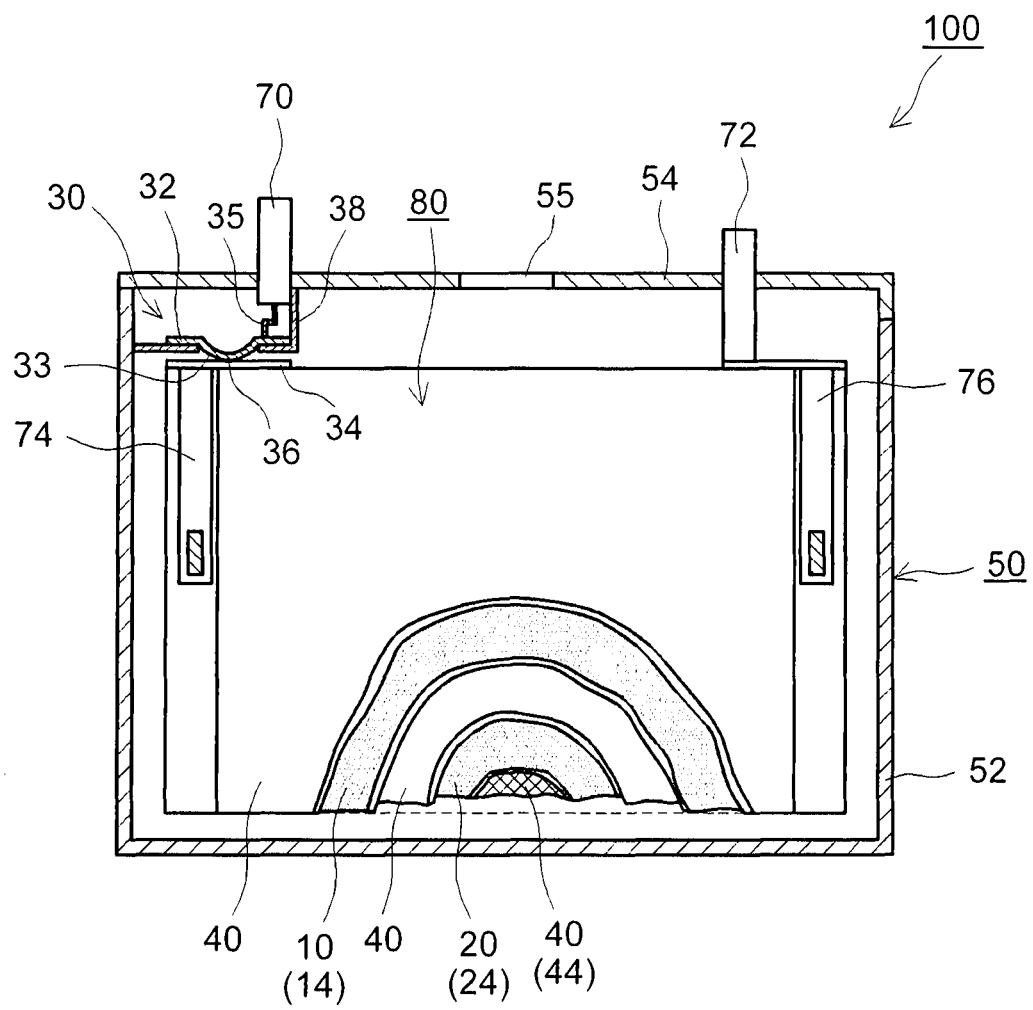
FIG. 2 is a schematic diagram showing a cross-sectional structure of a nonaqueous electrolyte secondary battery according to one embodiment of the present invention.

FIG. 2 schematically illustrates a cross-sectional structure of a nonaqueous electrolyte secondary battery according to one embodiment of the present invention. Broadly speaking, the nonaqueous electrolyte secondary battery 100 according to the present embodiment includes a battery case (an external container) 50, a wound electrode body 80 and a nonaqueous electrolyte not shown.

The battery case 50 is typically made of a metallic material such as aluminum, steel or the like. The battery case 50 includes a flat rectangular-parallelepiped (box-shaped) battery case body 52 with an upper end opening, and a lid 54 configured to close the opening of the battery case body 52. A positive electrode terminal 70 for external connection electrically connected to a positive electrode of the wound electrode body 80 and a negative electrode terminal 72 for external connection electrically connected to a negative electrode of the wound electrode body 80 are installed on the top surface of the battery case 50 (namely, in the lid 54). Just like the battery case of a nonaqueous electrolyte secondary battery in the related art, the lid 54 is provided with a safety valve 55 for discharging a gas generated inside the battery case 50 outside of the battery case 50.

A current interrupt device 30 operated by the increase in the internal pressure of the battery case 50 is installed in the battery case 50. The current interrupt device 30 may be configured to, when the internal pressure of the battery case 50 rises, cut off a conductive path (e.g., a charging path) extending from at least one of the electrode terminals to the wound electrode body 80. The current interrupt device 30 is not limited to a specific shape. For example, in the example shown in FIG. 2, the current interrupt device 30 is installed between the positive electrode terminal 70 fixed to the lid 54 and the wound electrode body 80 and is configured to, when the internal pressure (gas pressure) of the battery case 50 rises, cut off a conductive path extending from the positive electrode terminal 70 to the wound electrode body 80. More specifically, the current interrupt device 30 may include, e.g., a first member 32 and a second member 34. When the internal pressure of the battery case 50 rises, at least one of the first member 32 and the second member 34 (the first member 32 in this example) is deformed and is moved away from the other, thereby cutting off the conductive path. In the present embodiment, the first member 32 is a deformable metal plate and the second member 34 is a connection metal plate joined to the deformable metal plate 32. The deformable metal plate (the first member) 32 has an arch shape with the central portion thereof curved downward. The peripheral portion of the deformable metal plate 32 is connected to the lower surface of the positive electrode terminal 70 through a current collecting lead terminal 35. Further, the tip of the curved portion 33 of the deformable metal plate 32 is joined to the upper surface of the connection metal plate 34. A positive electrode current collecting plate 74 is joined to the lower surface (rear surface) of the connection metal plate 34. The positive electrode current collecting plate 74 is connected to the positive electrode 10 of the electrode body 80. Thus, there is formed a conductive path which extends from the positive electrode terminal 70 to the electrode body 80.

The current interrupt device 30 further includes an insulation case 38 made of a plastic or the like. The insulation case 38 is installed so as to surround the deformable metal plate 32 and is configured to hermetically seal the upper surface of the deformable metal plate 32. The internal pressure of the battery case 50 does not act on the upper surface of the hermetically-sealed curved portion 33. Further, the insulation case 38 has an opening portion into which the curved portion 33 of the deformable metal plate 32 is fitted. The lower surface of the curved portion 33 is exposed to an interior of the battery case 50 from the opening portion. The internal pressure of the battery case 50 acts on the lower surface of the curved portion 33 exposed to the battery case 50. In the current interrupt device 30 configured as above, if the internal pressure of the battery case 50 becomes higher, the internal pressure acts on the lower surface of the curved portion 33 of the deformable metal plate 32, thereby pushing the downwardly-bulging curved portion 33 upward. The pushing-up amount of the curved portion 33 increases as the internal pressure of the battery case 50 becomes higher. If the internal pressure of the battery case 50 exceeds a preset pressure, the curved portion 33 is turned upside down and is deformed so as to be curved upward. By virtue of the deformation of the curved portion 33, the joint point 36 of the deformable metal plate 32 and the connection metal plate 34 is cut off. Thus, the conductive path extending from the positive electrode terminal 70 to the electrode body 80 is cut off, whereby an overcharge current is interrupted. The current interrupt device 30 may be installed at the negative electrode terminal 72 rather than at the positive electrode terminal 70. The current interrupt device 30 is not limited to the mechanical cutoff accompanied by the deformation of the deformable metal plate 32. For example, the internal pressure of the battery case 50 may be detected by a sensor. If the internal pressure detected by the sensor exceeds a preset pressure, a charging current may be interrupted by an external circuit which is installed as a current interrupt device.

The flat wound electrode body 80 and the nonaqueous electrolyte not shown are contained in the battery case 50. At a stage prior to assembly, the wound electrode body 80 includes an elongated sheet-like positive electrode (positive electrode sheet) 10 and an elongated sheet-like negative electrode (negative electrode sheet) 20. The positive electrode sheet 10 includes an elongated positive electrode current collector and a positive electrode active material layer 14 formed on at least one surface (typically both surfaces) of the positive electrode current collector along the longitudinal direction thereof. The negative electrode sheet 20 includes an elongated negative electrode current collector and a negative electrode active material layer 24 formed on at least one surface (typically both surfaces) of the negative electrode current collector along the longitudinal direction thereof. Further, two elongated sheet-like separators 40 as insulation layers for preventing direct contact of the positive electrode active material layer 14 and the negative electrode active material layer 24 are disposed between the positive electrode active material layer 14 and the negative electrode active material layer 24. Each of the separators 40 includes an elongated resin-made substrate and a porous heat resistance layer 44 formed on one surface of the substrate (on the surface of the substrate facing the negative electrode sheet 20 in this example) along the longitudinal direction thereof. The wound electrode body 80 can be produced by, e.g., longitudinally winding a laminated body in which the positive electrode sheet 10, the separator sheet 40, the negative electrode sheet 20 and the separator sheet 40 are overlapped in the above order, and laterally pressing and crushing the obtained wound body into a flat shape.

A wound core portion obtained by overlapping and densely laminating the positive electrode active material layer 14 formed on the surface of the positive electrode current collector and the negative electrode active material layer 24 formed on the surface of the negative electrode current collector is formed in the central region of the wound electrode body 80 in a width direction which is defined as a direction extending from one Winding-axis-direction end portion to the other winding-axis-direction end portion of the wound electrode body 80. In the winding-axis-direction opposite end portions of the wound electrode body 80, a positive electrode active material layer non-forming portion of the positive electrode sheet 10 and a negative electrode active material layer non-forming portion of the negative electrode sheet 20 protrude outward from the wound core portion, respectively. A positive electrode current collecting plate 74 is attached to the positive-electrode-side protrusion portion. A negative electrode current collecting plate 76 is attached to the negative-electrode-side protrusion portion. The positive electrode current collecting plate 74 and the negative electrode current collecting plate 76 are electrically connected to the positive electrode terminal 70 and the negative electrode terminal 72, respectively.

The nonaqueous electrolyte secondary battery 100 configured as above can be produced by, e.g., putting the wound electrode body 80 into the battery case 50 through the opening portion of the battery case 50, attaching the lid 54 on the opening portion of the battery case 50, filling the nonaqueous electrolyte into the battery case 50 from an electrolyte filling hole (not shown) formed in the lid 54, and then sealing the electrolyte filling hole by welding or the like.

In the separator sheet 40 shown in FIG. 2, the porous heat resistance layer 4 is only formed on the surface of the separator sheet 40 facing the negative electrode sheet 20. However, the present invention is not limited to this embodiment. Porous heat resistance layers may be formed on both surfaces of the separator sheet 40. In this case, the porous heat resistance layer 4 formed on the surface of the separator sheet 40 facing the positive electrode sheet 10 and the porous heat resistance layer 4 formed on the surface of the separator sheet 40 facing the negative electrode sheet 20 may be identical in properties with each other or may differ in, e.g., the kind and percentage of the inorganic filler contained, the porosity and the like, from each other. Alternatively, the porous heat resistance layer 4 may be only formed on the surface of the separator sheet 40 facing the positive electrode sheet 10.

The nonaqueous electrolyte secondary battery disclosed herein can be used in various applications. Due to the fact that the nonaqueous electrolyte secondary battery exhibits high battery performance (e.g., the cycle characteristic) and high reliability (e.g., the overcharge resistance), it can be desirably used in an application where a high energy density is required or an application where high reliability is needed. Examples of these applications include a power source (power supply for driving) for a motor mounted to a motor vehicle. The kind of the motor vehicle is not particularly limited. Examples of the motor vehicle include a plug-in hybrid vehicle (PHV), a hybrid vehicle (HV), an electric vehicle (EV) and the like. The nonaqueous electrolyte secondary battery may be used in the form of a battery pack fabricated by connecting a plurality of batteries in series and/or in parallel.

Some examples according to the present invention will now be described. However, this description is not intended to limit the present invention to these specific examples.

Example 1

First, alumina powder (having an average particle diameter of 0.5 μm and a BET specific surface area of 4 $m^2/g$) as an inorganic filler, hollow bodies made of an acryl resin, and styrene-butadiene rubber (SBR) as a binder were weighed at a mass ratio of 85:10:5, and were mixed with ion-exchanged water using CLEARMIX (registered trademark) made by M Technique Co., Ltd., thereby producing a slurry composition. The composition was gravure-coated on one surface of a separator substrate having a three-layer structure of PP/PE/PP (having an average thickness of 20 μm and a porosity of 70 volume %) and was dried, thereby producing a separator sheet (having a total thickness of 25 μm) which includes a porous heat resistance layer having an average thickness of 5 μm formed on one surface of the substrate.

Then, a slurry composition was produced by mixing $LiNi_{1/3}Co_{1/3}Mn_{1/3}O_2$ powder as a positive electrode active material, polyvinylidene fluoride (PVdF) as a binder and acetylene black (AB) as a conductive material with N-methylpyrrolidone (NMP) such that the mass ratio of $LiNi_{1/3}Co_{1/3}Mn_{1/3}O_2$ powder, polyvinylidene fluoride, and acetylene black becomes equal to 100:3:3. The composition was coated in a strip shape at a width of 94 mm on both surfaces of an elongated aluminum foil (positive electrode current collector) having a thickness of 15 μm and was dried. The aluminum foil coated with the composition was pressed, thereby producing a positive electrode sheet (having a total thickness of 170 μm and a length of 4500 mm) which includes positive electrode active material layers formed on both surfaces of a positive electrode current collector.

Then, a slurry composition was prepared by mixing natural graphite powder as a negative electrode active material, styrene-butadiene rubber (SBR) as a binder, and carboxymethyl cellulose (CMC) (trade name "CELLOGEN: BSH-6" made by Dai-ichi Kogyo. Seiyaku Co., Ltd.) as a thickener with ion-exchanged water such that the mass ratio of natural graphite powder, SBR and CMC becomes equal to 100:1:1. The composition was coated in a strip shape at a width of 100 mm on both surfaces of an elongated copper foil (negative electrode current collector) having a thickness of 14 μm and was dried. The copper foil coated with the composition was pressed, thereby producing a negative electrode sheet (having a total thickness of 150 μm and a length of 4700 mm) which includes negative electrode active material layers formed on both surfaces of a negative electrode current collector.

The positive electrode sheet and the negative electrode sheet thus obtained were laminated one above another with the separator sheet interposed therebetween and were wound into an elliptical shape. Thereafter, the positive electrode sheet, the negative electrode sheet and the separator sheet thus wound were pressed flat under a normal temperature (25° C.) environment at a pressure of 4 kN/cm² for 2 minutes, thereby fabricating a flat wound electrode body. At this time, the separator sheet was disposed such that the porous heat resistance layer provided on the separator faces the positive electrode active material layer. Then, leads (terminals) each provided with a seal, which are made of the same kind of metal as the current collector, were welded to the end portions of the wound electrode body (the exposed portions of the positive electrode current collecting plate and the negative electrode current collecting plate). Thereafter, the wound electrode body was put inside a box-shaped battery case made of aluminum. The nonaqueous electrolyte of 125 g was filled into the battery case. Then, the opening portion of the battery case was hermetically sealed. In this way, 55 (N=55) nonaqueous electrolyte secondary batteries (having a rated capacity of 24 Ah) were produced. The nonaqueous electrolyte used at this time was prepared by dissolving $LiPF_6$ as a supporting salt at a concentration of 1.0 mol/L in a mixed solvent which contains ethylene carbonate (EC), dimethyl carbonate (DMC) and ethyl methyl carbonate (EMC) at a volume ratio of 3:4:3 and by adding biphenyl (BP) and cyclohexyl benzene (CHB) as a gas generating agent at a percentage of 1 mass % based on the entirety of the nonaqueous electrolyte.

Examples 2 to 14

In each of examples 2 to 14, 55 (N=55) nonaqueous electrolyte secondary batteries were produced in the same manner as in example 1 described above except that the properties (the particle porosity and the average particle diameter) of the hollow bodies and the content percentage of the hollow bodies in the porous heat resistance layer are changed as shown in Table 1 below. In examples 6, 7, 13 and 14 in which the content percentages of the hollow bodies in the porous heat resistance layers are differently set from the others, the difference of the hollow bodies from the whole solid content was allocated to the inorganic filler and the binder at the same percentage as in example 1.

TABLE 1

|  | Hollow Bodies | | | Initial Property IV Resistance (Ω) | Cycle Characteristic (50° C., 1000 cycles) | | High Temperature Storage Characteristic (60° C.) | |
| --- | --- | --- | --- | --- | --- | --- | --- | --- |
|  | Particle Porosity (%) | Average Particle diameter $D_{50}$ (μm) | Content Percentage (mass %) |  | Capacity Retention Rate (%) | Separator Thickness after Cycle (μm) | Capacity Retention Rate (%) | Overcharge Test after High Temperature Storage (N = 10) |
| Ex 1 | 50 | 1 | 10 | 3.09 | 90.1 | 25.0 | 97.4 | 10 |
| Ex 2 | 30 | 1 | 10 | 3.11 | 89.9 | 25.0 | 97.5 | 10 |
| Ex 3 | 80 | 1 | 10 | 3.08 | 90.2 | 24.5 | 97.3 | 10 |
| Ex 4 | 50 | 0.05 | 10 | 3.10 | 89.8 | 25.0 | 97.4 | 10 |
| Ex 5 | 50 | 4 | 10 | 3.09 | 90.0 | 25.0 | 97.3 | 10 |
| Ex 6 | 50 | 1 | 0.1 | 3.08 | 90.0 | 25.0 | 97.2 | 10 |
| Ex 7 | 50 | 1 | 50 | 3.13 | 89.8 | 25.0 | 97.5 | 10 |
| Ex 8 | — | — | 0 | 3.09 | 85.3 | 23.0 | 88.1 | 9 |
| Ex 9 | 85 | 1 | 10 | 3.10 | 85.4 | 23.1 | 88.2 | 6 |
| Ex 10 | 25 | 1 | 10 | 3.41 | 84.3 | 25.0 | 96.9 | 10 |
| Ex 11 | 50 | 0.02 | 10 | 3.10 | 85.4 | 23.4 | 88.4 | 7 |
| Ex 12 | 50 | 7 | 10 | 3.54 | 83.2 | 25.0 | 96.8 | 10 |
| Ex 13 | 50 | 1 | 0.05 | 3.09 | 85.2 | 23.2 | 88.2 | 6 |
| Ex 14 | 50 | 1 | 60 | 3.62 | 83.4 | 25.0 | 97.5 | 10 |

<Initial Property>

First, the initial capacity and the initial resistance were measured with respect to the batteries of examples 1 to 14. More specifically, the initial capacity was first measured by the following procedures 1 to 4 under a temperature environment of 25° C. in a voltage range of 3.0 V to 4.1 V. [Procedure 1] After charging the battery to 4.1 V at a constant current of 1 C, the charging is paused for 5 minutes. [Procedure 2] After discharging the battery to 3.0 V at a constant current of 1 C, the discharging is paused for 5 minutes. [Procedure 3] After charging the battery to 4.1 V at a constant current of 1 C, the battery is charged at a constant voltage until the current value becomes 0.1 C. Thereafter, the charging is paused for 10 seconds. [Procedure 4] After discharging the battery to 3.0 V at a constant current of 1 C, the battery is discharged at a constant voltage until the current value becomes 0.1 C. Thereafter, the discharging is paused for 10 seconds. The discharge capacity (the CCCV discharge capacity) in Procedure 4 was regarded as the initial capacity. It was confirmed that each of the batteries produced as above have a rated capacity.

Then, the battery was adjusted into a state in which the SOC is 60%. The battery was pulse-discharged for 10 seconds at a discharge rate of 10 C. The voltage drop amount was measured. The voltage drop amount thus obtained was divided by the corresponding current value, thereby calculating the IV resistance ($\Omega$). The results are shown in the relevant columns of Table 1. With respect to the respective examples; tests were carried out under a condition that N was set to 10. The arithmetic mean values are shown in Table 1.

<Cycle Characteristic>

With respect to the battery whose initial property has been confirmed, a cycle test of 1000 cycles was conducted by the following steps 1 and 2 at a temperature of 50° C. in a voltage range of 3.0 V to 4.1 V. In step 1, after charging the battery to 4.1 V at a constant current of 2 C, the charging was paused for 10 seconds. In step 2, after discharging the battery to 3.0 V at a constant current of 2 C, the discharging was paused for 10 seconds. After finishing the test, the discharge capacity (the battery capacity after the cycle test) was measured under a temperature environment of 25° C. in the same manner as the measurement of the initial capacity. The ratio "(battery capacity after cycle test/initial capacity)×100", namely the capacity retention rate (%), was calculated. The results are shown in the relevant column of Table 1. With respect to the respective examples, measurements were conducted under a condition that N was set to 5. The arithmetic mean values are shown in Table 1. Further, after finishing the cycle test, the battery was disassembled, and a total thickness was measured with the thickness gauge. The results are shown in the relevant column of Table 1. With respect to the respective examples, measurements were conducted under a condition that N was set to 5. The arithmetic mean values are shown in Table 1.

<High Temperature Storage Characteristic>

With respect to the battery whose initial property has been confirmed, a high temperature storage test was carried out. More specifically, under a temperature environment of 25° C., the battery was first adjusted into a state in which the SOC is 100%. Then, the battery was stored within a thermostatic oven of 60° C. for about 100 days. After finishing the test, the discharge capacity (the battery capacity after the high temperature storage test) was measured under a temperature environment of 25° C. in the same manner as the measurement of the initial capacity. The ratio "(battery capacity after high temperature storage test/initial capacity)×100", namely the capacity retention rate (%), was calculated. The results are shown in the relevant column of Table 1. With respect to the respective examples, tests were conducted under a condition that N was set to 50. The arithmetic mean values are shown in Table 1. Further, an overcharge test was conducted with respect to the battery which has been subjected to the high temperature storage test. More specifically, constant-current charging was performed under a temperature environment of 25° C. at a charge rate of 1 C (at a charge current of about 24 A) by setting the upper limit of a charge voltage at 20 V. Confirmation was made as to whether the current interrupt device is normally operated. The results are shown in the relevant column of Table 1. With respect to the respective examples, tests were conducted under a condition that N was set to 10. In Table 1, there is shown the number of the batteries in which the CID was normally operated with no change in the battery state (specifically, with no deformation of the case or no heating of the battery involving a rapid temperature rise). In other words, it can be said that the reliability (overcharge resistance) of the battery is high as the numerical value of the relevant column gets closer to 10.

As shown in Table 1, it can be noted that, in the batteries of examples 1 to 7, the initial resistance is kept low and the output characteristic is superior. Even after the cycle test, the thickness of the separator was kept unchanged. The reason appears to be that, since the porous heat resistance layer contains the inorganic filler and the hollow bodies made of an acryl resin, the influence of the stress (pressure) applied to the separator due to the repeated charging and discharging could be appropriately alleviated. Presumably, this makes it possible to appropriately maintain the distance between the positive electrode and the negative electrode, thereby realizing a battery which is relatively superior in the cycle characteristic and the high temperature storage characteristic. When overcharged, it was possible to have the gas generating agent react in a suitable manner, consequently realizing a battery which is high in reliability (overcharge resistance). These results show the technical meaning of the present invention.

In the batteries of examples 8, 9, 11 and 13, the thickness of the separator subjected to the cycle test was thinned by about 5% to 10%. Further, the cycle characteristic and the high temperature storage characteristic of the batteries were relatively low. Moreover, in the overcharge test conducted after high temperature storage, there appeared an example where the CID was not normally operated and the battery voltage reached the upper limit voltage. The reason appears to be that, since the shape-keeping characteristic (mechanical strength) of the porous heat resistance layer was deficient, the shape (thickness) of the porous heat resistance layer was changed by the expansion and contraction of the active material layer attributable to the charging and discharging. Further, in the batteries of examples 10, 12 and 14, the initial IV resistance was relatively high and the cycle characteristic was relatively low. The reason appears to be that the ion permeability (gas permeability) of the porous heat resistance layer was insufficient.

From the above results, it can be noted that the effects of the present invention are stably provided at a higher level if the porous heat resistance layer satisfies the following conditions that: (1) the particle porosity of the hollow bodies is 30% or more and 80% or less; (2) the average particle diameter of the hollow bodies is 0.05 µm or more and 5 µm or less; and (3) the percentage of the hollow bodies in the entirety of the porous heat resistance layer is 0.1 mass % or more and 50 mass % or less.

While specific examples of the present invention have been described in detail, these are merely illustrative and are not intended to limit the present invention. Different modifications and changes of the aforementioned specific examples are included in the present invention.

The invention claimed is:

1. A separator for a nonaqueous electrolyte secondary battery, comprising:
   a resin-made substrate; and
   a porous heat resistance layer disposed on the substrate,
   wherein the porous heat resistance layer includes an inorganic filler and hollow bodies,
   wherein each of the hollow bodies includes a shell portion and a hollow portion,
   wherein the shell portion is formed of an acryl resin,
   wherein the hollow portion is formed inside the shell portion, and
   wherein an opening portion extending through the shell portion to spatially interconnect the hollow portion and the outside of the shell portion is formed in the shell portion.

2. The separator according to claim 1, wherein a particle porosity of each of the hollow bodies is 30% or more and 80% or less.

3. The separator according to claim 1, wherein an average particle diameter of the hollow bodies measured by a laser diffraction and light-scattering method is 0.05 µm or more and 5 µm or less.

4. The separator according to claim 1, wherein a percentage of the hollow bodies in an entirety of the porous heat resistance layer is 0.1 mass % or more and 50 mass % or less.

5. The separator according to claim 1, wherein a porosity of the porous heat resistance layer is 20 volume % or more and 50 volume % or less.

6. The separator according to claim 1, wherein an average thickness of the porous heat resistance layer is 3 µm or more and 15 µm or less.

7. The separator according to claim 1, wherein the hollow portion is formed of a unitary space.

8. A nonaqueous electrolyte secondary battery, comprising:
   an electrode body including a positive electrode, a negative electrode and the separator according to claim 1 and
   a nonaqueous electrolyte,
   wherein the positive electrode and the negative electrode face each other with the separator interposed therebetween.

* * * * *